United States Patent

[11] 3,623,053

| [72] | Inventor | Arthur Stivers Meyer<br>West Chester, Ohio |
| --- | --- | --- |
| [21] | Appl. No. | 868,722 |
| [22] | Filed | Oct. 23, 1969 |
| [45] | Patented | Nov. 23, 1971 |
| [73] | Assignee | General Electric Company |

[54] LEAK-DETECTING APPARATUS
4 Claims, 2 Drawing Figs.

| [52] | U.S. Cl. | 340/242, 137/81.5, 340/244 R, 73/40.5 |
| --- | --- | --- |
| [51] | Int. Cl. | G01f 1/00 |
| [50] | Field of Search | 340/242, 243; 137/81.5; 73/40.5 |

[56] References Cited
UNITED STATES PATENTS

| 2,766,442 | 10/1956 | Meyer | 340/242 |
| --- | --- | --- | --- |
| 3,072,147 | 1/1963 | Allen et al. | 137/81.5 |
| 3,091,393 | 5/1963 | Sparrow | 137/81.5 |
| 3,168,105 | 2/1965 | Cisco et al. | 137/81.5 |
| 3,228,410 | 1/1966 | Warren et al. | 137/81.5 |
| 3,267,949 | 8/1966 | Adams | 137/81.5 |
| 3,277,914 | 10/1966 | Manion | 137/81.5 |

*Primary Examiner*—John W. Caldwell, Jr.
*Assistant Examiner*—Howard Cohen
*Attorneys*—Derek P. Lawrence, Oscar B. Waddell, Joseph B. Forman, Thomas J. Bird, Jr., Lee H. Sachs and Frank L. Neuhauser

ABSTRACT: A device for detecting leaks of a predetermined magnitude from fluid-containing apparatus, which device comprises an oversized drain tube skewed with respect to vertical and including a cup defined in part by the tube's lower interior wall so as to collect fluid flowing on the wall. The cup contains a small hole in its bottom surface for drainage. A sensing tube extends into the cup and is connected to switching means for sensing the presence of a predetermined fluid level in the cup and triggering an alarm in response thereto. Fluidic switching means which comprise a digital fluid amplifier are shown.

PATENTED NOV 23 1971

3,623,053

INVENTOR.
ARTHUR S. MEYER
BY
*Loren W. Peters*
ATTORNEY

LEAK-DETECTING APPARATUS

BACKGROUND OF THE INVENTION

This invention relates to fluid-flow-measuring apparatus, and more particularly to apparatus for detecting a predetermined fluid leakage flow. In fluid-containing apparatus having one or more dynamic seals, such as for example aircraft engine fuel controls or actuators, some fluid leakage can be accepted. However, such leakage must be minimized, and if predetermined safe operating limits are exceeded, provision should desirably be made for detecting such excess and signaling the need for terminating operation of the apparatus or for other corrective action. In many applications where dynamic seals subject to the development of leaks are used, drain tubes are provided to vent such leakage overboard to a point where it will not create a fire hazard or other undesirable effect. If the amount of fluid flowing through the drain tube can be measured adequately, at least insofar as it exceeds limits which would indicate a serious seal failure, the operator of the apparatus will then be provided with a positive indication that the apparatus should be shut down for maintenance. Standard flow measurement techniques, such as orifice pressure drop or positive displacement meter methods, are inapplicable to the problem at hand because of the relatively low flow rate which would indicate that corrective action is mandatory.

It is an object of this invention, therefore, to provide a relatively sensitive means for detecting excesses of fluid flow through a leakage drain tube, which means will be reasonably accurate at relatively low fluid flows.

BRIEF SUMMARY OF THE INVENTION

Briefly stated, the invention comprises an oversized drain tube containing a cup defined in part by the tube's lower interior wall so as to collect fluid flowing on the said wall. The cup includes a relatively small hole in its bottom surface which has a size adequate to drain acceptable leakage flows from the cup but which is too small to drain excessive leakage therefrom. A sensing tube extends into the cup and is connected to switching means adapted to trigger an alarm when the fluid level in the cup exceeds a predetermined value.

BRIEF DESCRIPTION OF THE DRAWINGS

While this specification concludes with claims particularly pointing out and distinctly claiming the invention, it is believed that it will be better understood by reference to the discussion below and the accompanying drawings in which:

DESCRIPTION OF THE PREFERRED EMBODIMENT

Figure 1:
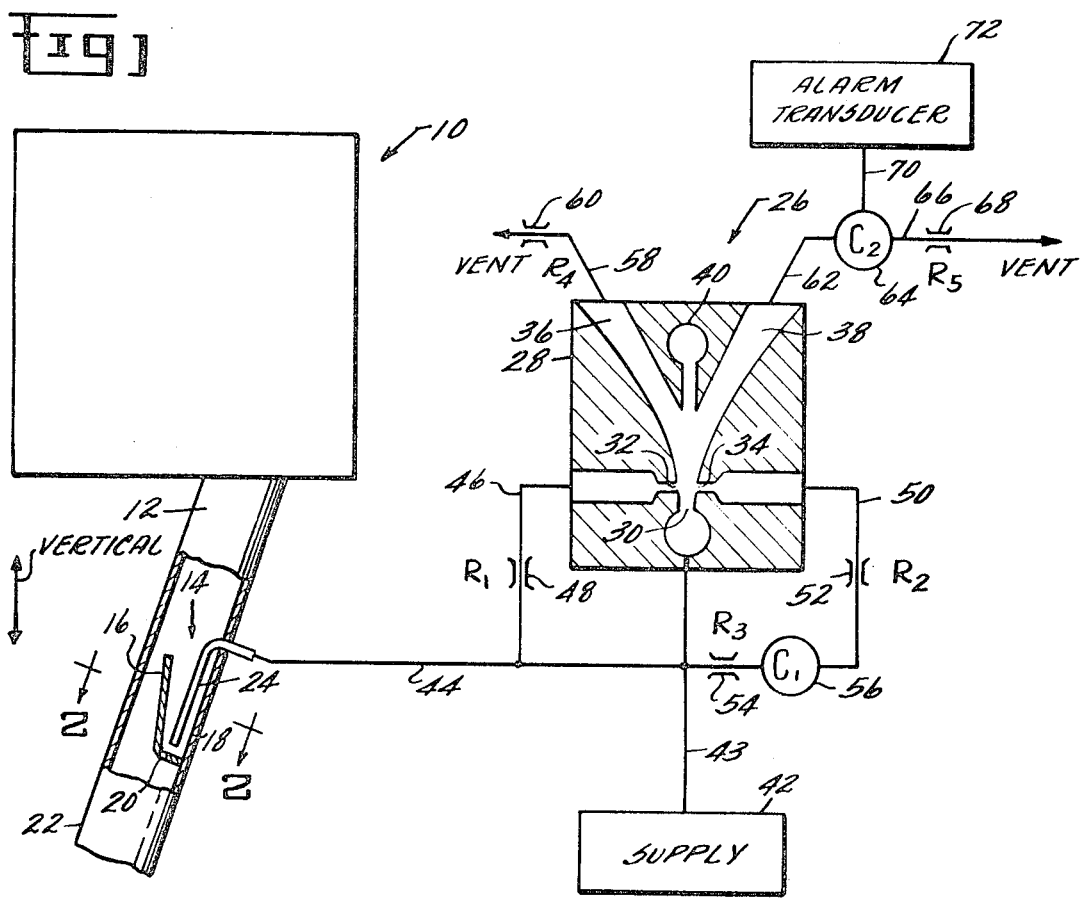
FIG. 1 is a partially sectioned, partially schematic view of the leakage detector.
Figure 2:
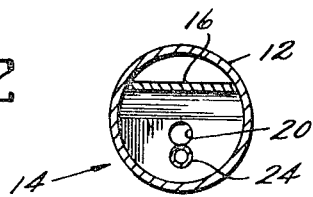
FIG. 2 is a section view taken along the lines 2—2 FIG. 1.

Referring to the drawings, a fluid-containing apparatus 10 is shown with a leakage drain tube 12 connected to and extending below it at a slight angle with the vertical. Tube 12 includes a cup 14 defined by a baffle plate 16 extending across a chord of the tube and a lower interior wall 18 thereof. A hole 20 is defined in the bottom of the cup 14 to discharge fluid collecting therein into the downstream tube portion 22. Hole 20 is relatively small, and its size is selected so that it will pass a level of fluid flow which represents acceptable leakage from apparatus 10 without the buildup of a substantial head in the cup 14, but will however require a rise in fluid level in cup 14 to pass fluid flow in excess of a predetermined leakage limit.

A sensing tube 24 extends into the interior of cup 14 and is connected to a switching means 26, which will sense the presence of fluid at the lower end of tube 24. Switching means 26 comprises a fluid amplifier 28 having a power nozzle 30 adapted to issue a fluid stream, a pair of control ports 32, 34 oppositely disposed with respect to the axis of power nozzle 30 and located adjacent thereto, a pair of receivers 36, 38 adapted to receive the fluid flowing from power nozzle 30, and a vent 40 for venting excess power fluid from amplifier 28. As shown, amplifier 28 is what is commonly referred to as a digital amplifier in that a threshold imbalance between the pressures appearing at control ports 32, 34 will cause a power stream issuing from power nozzle 30 to be diverted hard over into one of receivers 36, 38, there being no stable intermediate state for the said power stream. Devices such as that shown are also commonly referred to as wall attachment devices or Coanda effect devices, and their construction and operation are well documented in the patent and general technical literature. Alternatively to the fluid amplifier 28, a proportional fluid amplifier could be substituted provided its gain was sufficient to provide an adequate output level within the tolerance limits of leakage flow from apparatus 10.

Fluid for powering amplifier 28 is provided to power nozzle 30 from a fluid supply 42, which also doubles as a signal fluid supply, through a conduit 43. A first signal conduit 44 is supplied from conduit 43 and connected to sensing tube 24 to provide a low flow of signal fluid through tube 24 into cup 14. A second signal conduit 46 is connected at its one end to conduit 44 and at its other end to control port 32 and includes a restriction 48 (which may be for example an orifice) which restriction offers a greater flow resistance than that offered by sensing tube 24. Thus, when the fluid level in cup 14 is below the lower end of tube 24 signal fluid will flow both into cup 14 and into control port 32; however, the amount of fluid flowing into control port 32 will be minimal because of the higher resistance in the flow path provided by conduit 46 than in the flow path parallel with conduit 46 provided by conduit 44. If, however, the fluid level in cup 14 covers the lower end of tube 24, the path embodying tube 24 will have a relatively high flow resistance, and back pressure will build up in conduit 44. This back pressure will cause a higher fluid flow through conduit 46 and be reflected as a pressure signal at control port 32 which is adequate to switch amplifier 28.

A third signal conduit 50 is connected at its one end to conduit 43 and at its other end to control port 34 to provide a signal in opposition to that which appears as described above at control port 32. Conduit 50 includes in sequence a resistance $R_3$ (i.e., resistor 54), a capacitor $C_1$ (designated 56), and a resistance $R_2$ (designated 52). The resistances are sized in the descending order $(R_2+R_3)>R_1>$tube 24 resistance. When supply fluid is first turned on to the circuit, it will flow through conduits 44 and 48 and at the same time into capacitor 56 and the power nozzle 30, the fluid passing through conduit 48 into control port 32 being sufficient to switch amplifier 28 to an output at receiver 38. This switching is only temporary, however, inasmuch as capacitor 56 will at the same time be filling, and after it has filled fluid will flow through conduit 50 into control port 34 at a higher rate than through conduit 46 and switch amplifier 28 back to a state in which an output signal appears in receiver 36. In other words when the circuit is first turned on, amplifier 28 will provide a temporary output signal indicating excess leakage and then switch to a no leakage signal, which function serves as a checking operation to enable the operator to be sure that the circuit is in working order. If later, cup 14 fills to a level above the lower end of tube 24, the path through tube 24 will acquire a high flow resistance and the signal strength at port 32 will exceed that at port 34, causing amplifier 28 to switch its output to receiver 38.

Any output signal which appears in receiver 36 is vented through conduit 58 and resistor 60 ($R_4$) resistor 60 being provided to aid in stabilization of amplifier 28. On the other hand, if a high leakage signal in sensing tube 24 causes amplifier 28 to switch its output to receiver 38, the output signal is transmitted through conduit 62, capacitor $C_2$ (designated 64), conduit 66 and resistor 68 to vent. Because of resistor 68 this output signal state will cause a pressure buildup in capacitor 64 which is connected by a signal line 70 to an alarm transducer 72. Sensing of a pressure buildup in capacitor 64 will then switch transducer 72, which can be for example, one of several available or known types of electropneumatic transducers. Transducer 72 can be connected to an alarm bell, light, or other suitable indicating device.

Having above described a preferred embodiment of the present invention, although not exclusive of all possible equivalents, and explained its use, operation and function, what is desired to be secured by Letters Patent is specified by the claims appearing below.

What is claimed is:

1. In combination with a fluid-containing apparatus, a leak detector comprising:

a drain tube adapted to collect fluid leakage from a selected portion of said apparatus, said tube being oversized with respect to the normal leakage flow expected from said apparatus and being skewed with respect to vertical, said tube further including:

a cup defined in part by the tube's lower interior wall so as to collect fluid flowing on said lower interior wall, said cup blocking a portion of the flow section of the tube, said cup further including a relatively small hole in its bottom surface to facilitate drainage of fluid from the cup into that portion of the tube downstream thereof, said hole being sized so as to pass a level of fluid flow which represents an acceptable leakage rate for said apparatus, and a sensing tube extending into said cup; and switching means connected to said sensing tube for sensing the presence of a predetermined fluid level in said cup and triggering an alarm in response thereto.

2. The leak detector recited in claim 1 wherein said switching means comprises:

a fluid amplifier having a power nozzle to generate a fluid power stream, at least one control port for controlling said power stream, and at least one output means adapted to receive a portion of the power stream in response to a fluid pressure signal at the said control port;

a first signal conduit connected at its one end to said sensing tube and at its other end to a source of pressurized fluid; and a second signal conduit connected at its one end to said first signal conduit and at its other end to said control port, said second signal conduit including at a point intermediate its ends a flow restriction which exceeds that offered by the said sensing tube;

whereby a predetermined accumulation of leakage fluid in said cup will restrict the flow of signal fluid through said sensing tube, causing a back pressure in said signal conduits which will cause the power stream in said fluid amplifier to be switched to its output to trigger an alarm.

3. The leak detector recited in claim 1 wherein said switching means comprises:

a fluid amplifier having a power nozzle connected to a source of pressurized fluid to generate a fluid power stream, a pair of control ports oppositely disposed with respect to the axis of said power nozzle adjacent thereto, and a pair of output receivers adapted to selectively receive said power stream in response to control signals at said control ports, one of said output receivers being connected to an alarm transducer; and a signal conduit system comprising:

a first signal conduit connected at its one end to a signal fluid source and at its other end to said sensing tube, a second signal conduit connected to its one end to said first signal conduit and at its other end to the control port which is adapted to divert the said power stream toward the said output receiver which is connected to the alarm transducer, said second signal conduit including a flow restriction which exceeds that offered by the said sensing tube, and a third signal conduit connected at its one end to said signal fluid source and at its other end to the other of said control ports, said third signal conduit including a flow restriction whose flow resistance exceeds that of the restriction in said second signal conduit.

4. The leak detector recited in claim 3 wherein said third signal conduit additionally includes a capacitive volume.

* * * * *